United States Patent [19]
Kayser

[11] 3,799,559
[45] Mar. 26, 1974

[54] SEAL ASSEMBLY FOR ROTATABLE AND AXIALLY MOVABLE SHAFT

[76] Inventor: Allan J. Kayser, 345 S. Race St., Denver, Colo. 80209

[22] Filed: Nov. 22, 1971

[21] Appl. No.: 200,977

[52] U.S. Cl. ................................. 277/41, 277/85
[51] Int. Cl. ............................................. F16j 15/40
[58] Field of Search ............ 277/39, 40, 41, 38, 85

[56] References Cited
UNITED STATES PATENTS

| | | | |
|---|---|---|---|
| 3,379,443 | 4/1968 | Park et al. | 277/40 |
| 3,061,318 | 10/1962 | Laser | 277/39 |
| 3,048,413 | 4/1962 | Wood | 277/95 |
| 2,706,652 | 4/1955 | Berger | 277/41 |
| 2,971,783 | 2/1961 | Laser | 277/26 |

*Primary Examiner*—Samuel B. Rothberg

[57] ABSTRACT

An oil seal assembly disposed between an axially and rotatably movable shaft and a stationary housing includes one or more carbon sealing rings in combination with rubber seal elements in a common seal housing, and the sealing ring or rings are spring-loaded to establish rotational sealing interfaces within the housing so as to effectively seal against the loss of oil through the housing while minimizing the friction and wear between the relatively moving members.

11 Claims, 5 Drawing Figures

SEAL ASSEMBLY FOR ROTATABLE AND AXIALLY MOVABLE SHAFT

The present invention relates generally to fluid seals and more particularly to a novel and improved long-lasting oil seal assembly between a stationary housing and a rotatable and axially movable shaft.

In certain mechanical apparatus it is important that a reliable seal be provided between a stationary housing having a fluid reservoir and an axially and rotatably movable shaft passing through the reservoir and protruding outwardly through an opening in the housing wall. A specific example of such an apparatus is the transmission of a motorized vehicle wherein a reliable oil seal is required between the transmission shaft and the transmission housing, and specifically wherein the shaft is both rotatable and axially movable with respect to the housing. In accordance with the present invention an oil seal is provided by using at least one seal ring of a long-wearing material having a low coefficient of friction and mounting the seal ring on the rotatable and axially movable shaft with a sealing O-ring whereby a fluid-tight seal is established between the seal ring and the shaft both under rotational and axial movement of the shaft with respect to the housing. The frictional engagement between the shaft and the O-ring and between the O-ring and the seal ring will cause the O-ring and the seal ring to rotate in unison with the shaft. One annular radial surface of the seal ring abuts against a smooth surface of a hardened material such as steel which may be a surface of the housing itself or the surface of a washer-type member which is concentric with the shaft and mounted to remain in sealed stationary relationship with the housing. The engagement of the radial surface of the seal ring with the smooth surface of steel effects the necessary sealing engagement for a rotative seal under the influence of a biasing member which urges the relatively movable seal ring into pressured engagement with the smooth surface. Any oil leaking past the rotative seal is captured in a pocket and prevented from escaping in a radial inward direction by the centrifugal force of the seal ring. It will, therefore, be appreciated that a positive fluid-tight seal will exist between the shaft and the housing when the shaft and housing are motionless or when the shaft is rotating or moving axially relative to the housing.

Accordingly, it is an object of the present invention to provide a novel and improved fluid seal between a stationary housing and an axially and rotatably movable shaft received in the housing.

It is another object of the present invention to provide a long-lasting reliable seal of simple construction.

It is still another object of the present invention to provide an oil seal assembly between a stationary housing and an axially and rotatably movable shaft wherein the seal functions both as a rotary and linear seal which is self-compensating for wear and is specifically adaptable for use in an automotive transmission in establishing an effective rotational and axial seal under high speeds of rotation.

It is still another object of the present invention to provide an oil seal assembly which catches any oil that leaks radially outwardly past a rotating seal ring in a pocket and prevents it from moving radially inwardly by the centrifugal force of the rotating seal ring.

Other features, advantages and capabilities of the present invention will become more readily apparent when taken in conjunction with the accompanying drawings, in which.

Figure 1:
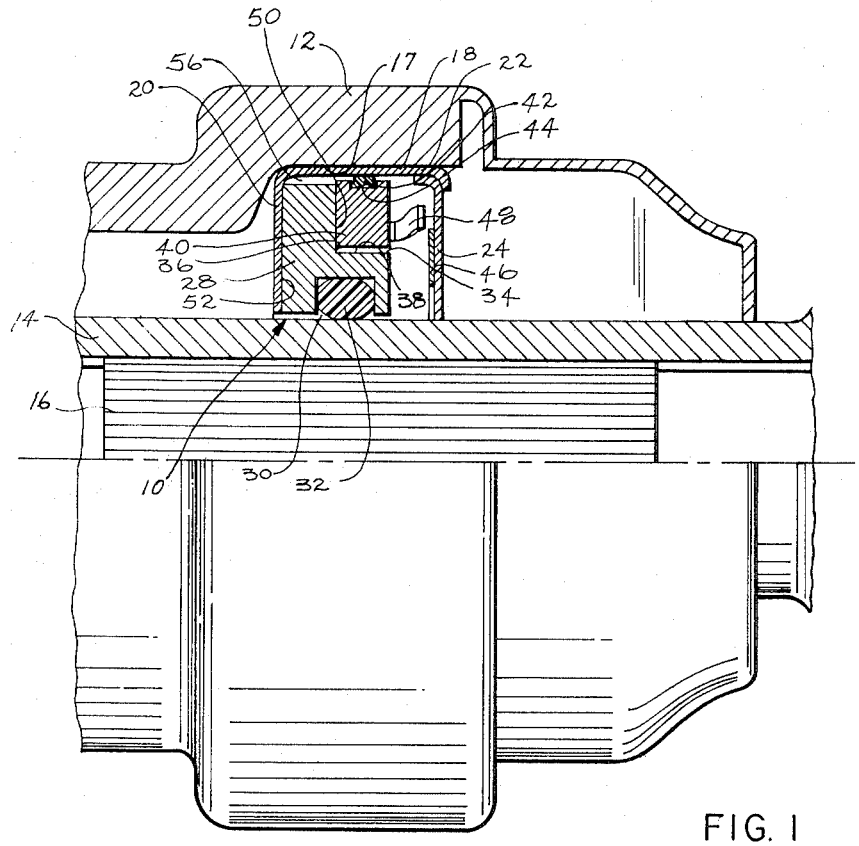
FIG. 1 is a fragmentary vertical section taken through a housing having an axially and rotatably movable shaft mounted therein and one embodiment of the fluid seal of the present invention in sealing engagement with the shaft and housing.

Referring now to FIG. 1, a preferred form of the seal assembly 10 of the present invention is shown in use in an automotive transmission housing for preventing the leakage of oil, it being understood that the seal 10 would be equally applicable in any instance wherein a fluid-tight seal is required around a rotatable and axially movable shaft. Specifically, the seal 10 is shown in use as an extension housing seal at the rear end of a transmission housing between an extension housing 12 and the rotatable and axially movable transmission drive shaft 14 which is splined into the output shaft 16 of the transmission. The extension housing 12 has in its outer end an annular recess 17 concentric with the drive shaft 14. The recess 17 snugly receives an angular shell 18, comprising a portion of the housing of the seal, having a smooth radial wall 20 extending substantially the entire distance between the housing 12 and the drive shaft 14 and an outer axial wall 22. A radial annular cover plate 24, also part of the seal housing, is fixed to the outer axial wall 22 and extends radially inwardly into closely spaced relation to the drive shaft 14 as a protective shield for the seal 10.

The seal assembly 10 of the present invention which is adapted for application wherein the fluid pressure does not greatly exceed 5 psi, includes a seal ring 28 which has an inner diameter slightly greater than the outside diameter of the drive shaft 14. The seal ring 28 is preferably made of a durable, low heat-generating and long-wearing material having a low coefficient of friction such as carbon. However, depending on the particular application, it is anticipated that materials which have a low coefficient of friction such as Teflon, Nylon or a suitable carbon composition may be used. It is also possible that a ring of most any rigid material which has been coated with a material having a low coefficient of friction could be used. The low friction material when lubricated should have a coefficient of friction of no more than 0.010 when in contact with steel. The seal ring 28 has an annular recess or groove 30 opening radially inwardly which retains an annular sealing member in the form of a rubber O-ring 32. In its relaxed state, the O-ring 32 has an inner diameter slightly less than the outside diameter of the drive shaft 14 whereby the O-ring provides a positive fluid-tight seal along its circle of engagement with the drive shaft. The O-ring 32 is tightly sealed in the annular recess 30 against radial walls 31 and an axial wall 33 so that rotation of the drive shaft 14 will cause both the O-ring 32 and the seal ring 28 to rotate in unison therewith. The radial wall 31 of the recess 30 on their inward radial extent diverge slightly outwardly (approximately 5 percent) in opposite axial directions for best seating of the O-ring 32. The shaft is free to move axially with respect to the extension housing 12, in which case the O-ring will slide along the outside surface of the drive shaft always maintaining a positive annular fluid-tight seal. In other words, the O-ring 32 will seal against fluid leakage past the circle of contact of the seal 10 with the drive shaft 14 during linear axial movement of the shaft as the seal rotates with the shaft.

Figure 4:
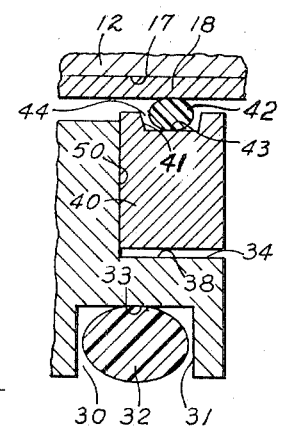
FIG. 4 is an enlarged fragmentary section of a portion of the seal of FIG. 1.

The seal ring 28 is also provided with an annular notch or recess 34 having a smooth radial surface 36 and an axial surface 38 such that the notch opens radially outwardly as well as axially toward the cover plate 24. The notch 34 is adapted to receive a pressure ring 40 of a hardened material, such as steel, which has an inner diameter that is slightly greater than the diameter of the annular axial surface 38 of the notch 34. The outer diameter of the pressure ring 40 is slightly less than the inner diameter of the outer axial wall 22 of the shell 18 whereby an O-ring 42 tightly seated against radial walls 41 and an axial wall 43 in an annular groove or recess 44 (FIG. 4) in the pressure ring will provide a positive annular fluid-tight seal between the axial wall 22 and the pressure ring 40. The radial walls 41 on their outward radial extent diverge outwardly (approximately 5°) in opposite axial directions for best seating of the O-ring 42.

Figure 2:
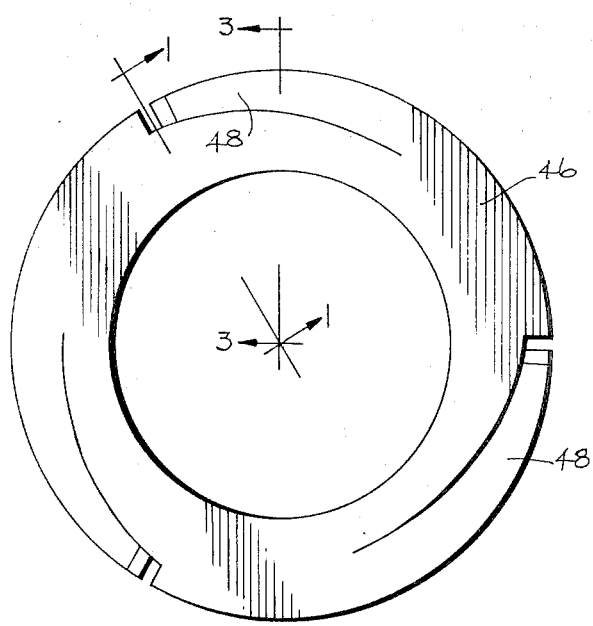
FIG. 2 is an axial view of the spring means used in the seal of FIG. 1.
Figure 3:
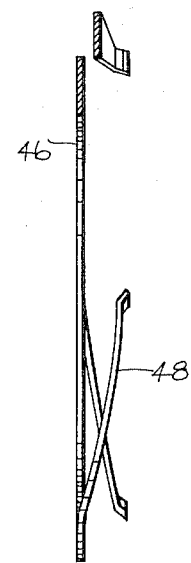
FIG. 3 is a side view of the spring means of FIG. 2.

The seal assembly 10 is spring-loaded in an axial direction by a biasing ring 46 having spring members 48 arranged at equally spaced, circumferential intervals secured to the cover plate 24 on the inner surface thereof in a position to positively urge the pressure ring 40 in an axial direction toward the smooth radial surface 36 of the seal ring 28. The spring members, as seen in FIGS. 2 and 3, generally are constructed and arranged to extend forwardly from the cover plate 24 against the outside of the pressure ring. To this end, preferably the spring members are defined by generally web-shaped forwardly convergent leaf springs which have been formed out of the body of the ring 46 by making arcuate slits which extend spirally and inwardly from the outer perimeter of the ring 46, bending the slit portions out of the plane of the base of the ring 46, and crimping the free end of each leaf spring slightly in a forward direction to strengthen it.

It will be apparent that the force exerted on the pressure ring 40 in an axial direction will cause the pressure ring, which has a smooth surface adjacent the smooth radial surface 36 of the notch 34 in the seal ring, to be uniformly pressed against the radial surface 36. An annular fluid-tight seal is thereby created along the interface 50 of the pressure ring and the radial surface 36. The leaf springs 48 are also effective, through the pressure ring, to force the seal ring 28, which has a smooth surface adjacent the smooth radial wall 20 of the shell 18, against the radial wall 20. Thus, an annular fluid-tight seal is also created along a major surface area of the wall 20 at the interface 52 of the seal ring and the radial wall 20.

As pointed out before, the O-ring 32 and the seal ring 28 are caused to rotate with the drive shaft 14 because of the frictional engagement of the O-ring 32 with the shaft and the seal ring. However, the pressure ring 40 is always held stationary because of the frictional engagement of the O-ring 42 associated therewith with the shell 18 of the housing recess 17. Due to the low coefficient of friction of the seal ring 28, there is negligible drag along the interfaces 50 and 52 and thus very little tendency for the seal ring 28 to cause the pressure ring 40 to rotate through contact along interface 50. It will be appreciated, however, that the interfaces 50 and 52 are formed along relatively large areas whereby a reliable positive fluid-tight seal is effected along these surfaces even during rotation of the shaft.

In operation, when the drive shaft is rotating at a high speed, the seal ring 28 and the pressure ring 40 have a tendency to undergo slight movements against the bias of the spring members 48. When doing so, small amounts of oil will move radially outwardly due to centrifugal force from around the drive shaft along the interface 52. This occurrence is desirable in that it lubricates the interface 52 thereby reducing wear of the associated elements. Any oil passing beyond the interface 52 will accumulate in a pocket or void 56 between the seal ring 28 and the axial wall 22 of the shell 18. It will be appreciated that oil accumulated in the pocket 56 will be prevented from escaping by the O-ring 42, which sealingly engages the wall 22, and the centrifugal force of rotation will minimize passage of any oil radially inwardly along the interface 50 between the seal ring and the pressure ring.

It will thus be appreciated that the fluid seal assembly 10 of the present invention is effective in preventing fluid from passing from one side of the seal to the other regardless of whether the shaft is immobile, moving axially, or rotating. Practically speaking, the seal created between the O-ring 32 and the drive shaft 14 may be termed a linear seal as it establishes a fluid-tight seal during relative linear movement between the O-ring 32 and the shaft; whereas, the seals created along interfaces 50 and 52 may be termed rotational seals in that they form fluid-tight seals between relatively rotatable surfaces forming the interfaces.

The seal along interface 52 is in actuality the primary rotational seal in that fluid would have to leak past interface 52 before reaching interface 50. Therefore, the rotational seal along interface 50 as well as the seal between the O-ring 42 and the shell 18 are secondary or back-up seals giving the fluid seal 10 a high degree of reliability.

By way of illustration only and without limiting the invention, the following dimensions of a drive shaft and a fluid seal assembly made in accordance with the present invention are submitted as being typical of a leak-proof seal which has been successfully tested. A seal housed in a shell with an axial wall having an external diameter of 2.000 (+.000, −.002) inch and an internal diameter of 1.943 (+000, −.001) inch was snugly fitted in a 2.000 inch diameter annular recess in a transmission housing which had an output shaft protruding therefrom with a diameter of 1.301 inch. A seal ring of carbon material mounted concentrically within the shell so as to abut against a first radial surface of the shell had an outer diameter of 1.901 (+.000, −.004) inch and an inner diameter of 1.304 (+.003, −.000) inch and was provided with an annular groove in its inner axial wall, the groove having an axial wall with a diameter of 1.547 (+.003, −.000) inch and a width along its axial surface of 0.187 (+.005, −.000) inch. An annular recess cut in an outer edge of the seal ring had an axial surface with a diameter of 1.713 (+.000, −.003) inch being 3/16 of an inch wide. A pressure ring of steel material having an outer diameter of 1.935 (+.000, −.002) inch and an inner diameter of 1.741 (+.002, −.000) inch was seated in the annular recess. The steel pressure ring had an annular groove in its outer axial wall which had an axial surface that had a diameter of 1.826 (+.000, −.002) inch and was 0.093 (+.005, −.000) inch wide. A biasing ring with a base having an outer diameter of 1.883 (+.000, −.005) inch and an inner diameter of 1.320 (+.005, −.000) inch was mounted on the second radial wall of the shell within the recess so as to exert an axial biasing force on the pressure ring in the direction of the first radial surface of the shell. The biasing force was effected through three circumferentially spaced leaf-type springs which were arcuately cut out of the biasing ring so as to be 0.500 inch in length with a maximum width of 1/8 of an inch and so as to make an angle of 45° with the base of the biasing ring.

Figure 5:
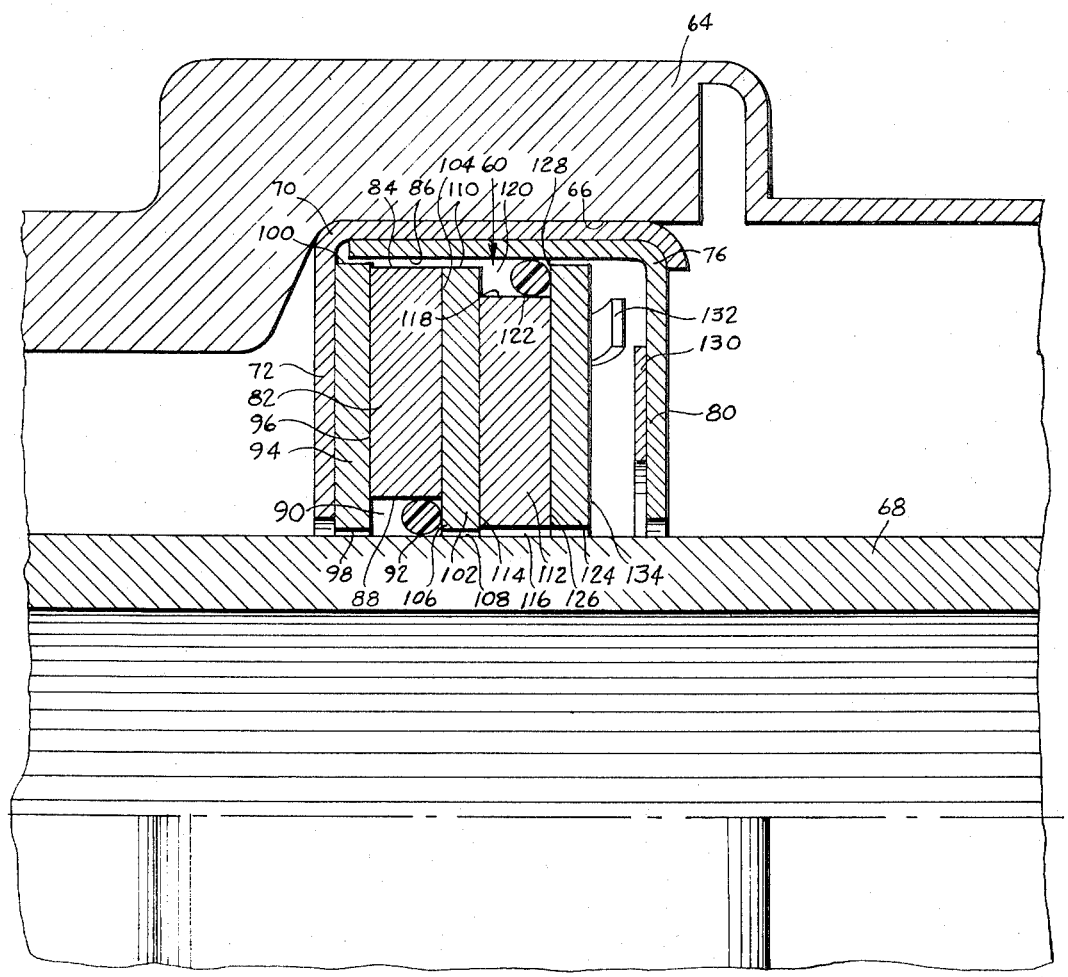
FIG. 5 is a fragmentary vertical section similar to FIG. 1 showing a second embodiment of the fluid seal of the present invention.

A second embodiment of the seal of the present invention, which is designed to withstand higher pressures than the first described embodiment, is shown in FIG. 5.

The seal 60 of this embodiment is shown mounted in the outer end of a housing which may be an extension housing 64 of a transmission as described in connection with the first-described embodiment shown in FIGS. 1-4. The extension housing 64 has an annular recess 66 concentric with a rotatable and axially movable drive shaft 68. The recess 66 is lined with an angular shell or seal housing 70 having a radial wall 72 and an axial outer wall 74. A cover plate 76 is fixed to the shell so as to have an axial wall 78 disposed against the inner surface of the outer axial wall 74 of the shell and a radial end wall 80 which turns radially inwardly from the axial wall 78 and continues down into closely spaced relationship with the drive shaft.

The seal 60 of the second embodiment can be seen to have a primary seal ring 82 made of a low friction long-wearing material such as carbon which has a rectangular transverse cross section. The primary seal ring 82 has an outer diameter defined by an outer axial surface 84 that is slightly less than the diameter of the inner surface 86 of the axial wall 74 of the cover plate so that the primary seal ring 82 can be mounted concentrically about the drive shaft without engaging the inner surface 86 of the cover plate. The inner diameter of the primary seal ring as defined by the inner axial surface 88 is somewhat greater than the diameter of the drive shaft 68 so that an annular gap 90 is provided between the axial surface 88 of the primary seal ring and the drive shaft. A rubber O-ring 92 is concentrically mounted on the drive shaft within the gap 90 and has a relaxed inner diameter which is slightly less than the diameter of the drive shaft so that when the O-ring 92 is placed on the drive shaft an annular seal will exist between the O-ring and the drive shaft. The thickness of the O-ring 92 is slightly greater than the thickness of the gap between the primary seal ring and the drive shaft so that the O-ring will sealingly engage the inner axial surface 88 of the primary seal ring. It will thus be appreciated that, with the O-ring 92, in contact with both the drive shaft 68 and the primary seal ring 82, the O-ring and the primary seal ring will be caused to rotate in unison with the drive shaft.

A spacer ring 94 taking the form of a steel washer is disposed concentrically about the drive shaft 68 so as to abut against the inner radial surface 96 of the primary seal ring. The spacer ring 94 also abuts against the radial wall 72 of the shell and will ordinarily remain stationary relative thereto because of friction; however, to positively prevent relative movement between the spacer ring and the radial wall 72 and, to assure a positive seal along the interface therebetween, a coating of a conventional sealing compound may be spread on the interface between the spacer ring and the radial wall. The inner diameter of the spacer ring as defined by the inner axial surface 98 is slightly greater than the diameter of the drive shaft, and the outside diameter of the spacer ring as defined by the outer axial surface 100 is slightly less than the diameter of the inner surface 86 of the cover plate; however, the difference between the inner diameter of the spacer ring and the diameter of the drive shaft is greater than the difference between the outer diameter of the spacer ring and the diameter of the inner surface of the cover plate so that when the spacer ring is disposed around the drive shaft it is impossible for it to contact the drive shaft. By so dimensioning the spacer ring 94, it will be seen that, even though the drive shaft rotates relative to the spacer ring, the spacer ring will not groove or otherwise scar the surface of the drive shaft during relative rotation since there is no contact between the two members.

An intermediate pressure ring 102 is disposed concentrically about the drive shaft in abutting relationship with the outer radial surface 104 of the primary seal ring 82. For reasons to be explained later, the O-ring 92 in the gap 90 will always be urged against the inner radial wall 106 of the intermediate pressure ring which forms a radial wall for the gap 90. Due to this engagement between the O-ring 92 and the intermediate pressure ring 102 the intermediate pressure ring is caused to be rotated in unison with the drive shaft, the O-ring 92, and the primary seal ring. The inside diameter of the intermediate pressure ring as defined by the inner axial surface 108 is slightly greater than the diameter of the drive shaft and the outside diameter of the intermediate pressure ring as defined by the outer axial surface 110 is slightly less than the diameter of the inner surface 86 of the cover plate. However, the difference between the outside diameter of the intermediate pressure ring and the drive shaft is less than the difference between the outside diameter of the intermediate pressure ring and the inner surface of the cover plate so that it is impossible for the intermediate pressure ring to contact the inner surface of the cover plate. In this manner, even though the intermediate pressure ring rotates relative to the cover plate, it will not scar or make any type of groove in the inner surface of the cover plate during relative rotation.

A secondary seal ring 112, also made of a material having a low coefficient of friction and being long-wearing such as carbon is disposed concentrically about the drive shaft in abutting relationship against the outer radial wall 114 of the intermediate pressure ring. The inner diameter of the secondary seal ring defined by the inner axial surface 116 is slightly greater than the diameter of the drive shaft and the outer diameter of the secondary seal ring as defined by the outer axial surface 118 is somewhat less than the diameter of the inner surface 86 of the cover plate whereby an annular gap 120 is created between the outer axial surface 118 of the secondary seal ring 112 and the inner surface of the cover plate. An outer O-ring 122, similar to but having a larger diameter than the inner O-ring 92, has a relaxed inner diameter that is slightly less than the outer diameter of the secondary seal ring. The outer O-ring is disposed about the secondary seal ring so that it fits snugly against the outer axial surface 118 of the secondary seal ring. The thickness of the O-ring 122 is slightly greater than the thickness of the gap 120 so that the O-ring positively and sealingly engages the inner surface 86 of the cover plate as well as the outer axial surface 118 of the secondary seal ring. Due to the engagement of the outer O-ring with both the cover plate and the secondary seal ring, the secondary seal ring is caused to remain stationary relative to the cover plate and thus the extension housing 64.

An outer pressure ring 125 which takes the form of a steel washer having the identical dimensions of the spacer ring 94 is concentrically mounted about the drive shaft in abutting relationship with the outside radial surface 126 of the secondary seal ring 112. The outer pressure ring 124, therefore, has an inner radial surface 128 which forms an annular end wall of the gap 120 around the secondary seal ring and, for reasons to be explained later, the O-ring 122 in the gap is caused to continually engage this inner radial surface 128 of the outside pressure ring. Because of the engagement between the O-ring 122 and the outer pressure ring, the outer pressure ring is caused to remain stationary relative to the O-ring and consequently relative to the secondary seal ring and the cover plate. As was explained earlier with reference to the dimensions of the spacer ring 94, the outer pressure ring which is identical to the spacer ring will not engage the drive shaft so that no grooves or other marring marks can be made on the drive shaft during relative rotation between the drive shaft and the outer pressure ring.

A biasing ring 130, identical to the biasing ring 46 described in the first embodiment of the invention is mounted on the radial end wall 80 of the cover plate so as to circumscribe the drive shaft. As was explained in the description of the first embodiment, the biasing ring has three radially spaced leaf springs 132 (only one of which is shown) which engage the outer radial surface 134 of the outer pressure ring so as to bias or urge the other elements of the seal in an inward axial direction. The radial surfaces of the spacer ring 94, the intermediate pressure ring 102 and the outer pressure ring 124 are all polished and smooth so that positive sealing engagement between the respective ring members and the two seal rings is effected, even between adjacent rings which rotate relative to each other. The pressure exerted on the outer pressure ring 124 can be seen to be transmitted through the adjacent respective rings so that positive seals are made along each interface between adjacent rings.

Each of the O-rings is caused to continually engage the radial surface of the pressure member on its outward axial side because of the fluid pressure within the housing which always exerts a pressure in the outer axial direction. In this manner, the respective pressure rings are caused to rotate or not rotate according to the corresponding movement of the O-ring with which it is engaged.

A feature of the second embodiment which was not disclosed with regard to the first embodiment but which could be incorporated therein, is the provision of the spacer ring 94. An advantage in using the spacer ring is that it is very simple to polish the radial walls of the spacer ring whereas it is more difficult to polish the radial wall 72 of the shell 70 against which the primary seal ring 82 would abut if the spacer ring were not used. The additional cost of providing the spacer ring would usually not be as great as the difference in the cost of polishing the spacer ring and that of polishing the radial wall of the shell, so that, generally speaking, it would be more economical to utilize a spacer ring.

It will be appreciated that with the design of the second embodiment of the present invention a linear seal is created along the circle of engagement of the inner O-ring 92 and the drive shaft 68 so that axial movement of the drive shaft relative to the seal 60 can be effected without oil leakage from inside the housing. A primary rotational seal is effected along the interface between the spacer ring 94 and the primary seal ring 82 which, as mentioned hereinbefore, rotate relative to one another. A secondary or back-up rotational seal is effected along the interface between the intermediate pressure ring 102 and the secondary seal ring 112 which would prevent any oil which might leak along the primary seal, and would thus be collected between the seal 60 and the inner surface 86 of the cover plate, from passing back in a radial inward direction toward the shaft. It should also be stated that centrifugal force would tend to prevent the oil from moving in an inward radial direction past the secondary rotational seal. The circular engagement of the outer O-ring 122 with the inner surface 86 of the cover plate provides assurance that any oil which leaked past the primary rotational seal, and thus was collected between the seal 60 and the inner surface of the cover plate, would not be able to escape along the inner surface of the cover plate beyond the outer O-ring. Thus, the seal between the outer O-ring and the cover plate is a precautionary or safety seal giving the seal 60 a high degree of reliability. A first static seal is created between the primary seal ring 82 and the intermediate pressure ring 102, which rings, as mentioned before, do not rotate relative to each other, and a second static seal is created between the secondary seal ring 112 and the outer pressure ring 124 which also do not rotate relative to each other. These two static seals are additional precautionary or safety sealing interfaces to increase the reliability of the overall seal.

It is contemplated that the seal disclosed in the second embodiment, and with minor alterations the seal of the first disclosed embodiment, could be adapted to withstand greater fluid pressures by mounting the biasing ring 130 on the radial wall 72 of the shell rather than on the inwardly turned end wall 80 of the cover plate. In this manner the biasing ring would be exerting an outward pressure on the elements of the seal and would thereby cooperate with, rather than oppose, the fluid pressure exerted from the fluid within the housing. With this type of arrangement the outer radial surface 134 of the outer pressure ring might be coated with a conventional sealing compound so that its engagement with the inwardly turned end wall 80 of the cover plate would be sufficiently sealed and held motionless relative to the cover plate.

It is therefore to be understood from the foregoing description that various changes and modifications may be made therein without departing from the spirit and scope of the invention as defined by the appended claims.

What is claimed is:

1. An oil seal assembly between an outer member having an axial opening therein for receiving a spaced inner member, one of said members being movable axially and rotatably with respect to the other, and wherein said outer member has a recess around said opening having a radial wall extending a greater portion of the distance from the inner member to the outer member and an axial wall, said seal assembly comprising a seal ring composed of a low coefficient of friction material disposed concentrically around the inner member in said recess in said outer member, said seal ring having an annular groove therein opening radially inwardly, a high coefficient of friction sealing member seated in the annular recess in annular sealing engagement with the inner member and the seal ring, a pressure member disposed along one side of the seal ring, and resilient means for urging the pressure member in an axial direction whereby the pressure member is pressed against the seal ring to define a first sealing interface and the seal ring is pressed against the radial wall of the outer member to establish full surface contact along a major surface area of the radial wall to define a second sealing interface therewith so that fluid is prevented from passing across the first and second sealing interfaces.

2. The fluid seal of claim 1 wherein said seal ring has an annular recess facing said resilient means and wherein said pressure member is adapted to fit into said annular recess in positive engagement with said resilient means.

3. The fluid seal of claim 1 wherein the annular recess also opens radially outwardly and wherein the pressure member has an annular groove opening radially outwardly having a sealing member seated therein which annularly engages the axial wall of the outer member in sealing relation therewith and with the pressure member.

4. The fluid seal of claim 3 wherein the sealing members are each in the form of O-rings of a rubber or rubber-like material.

5. The fluid seal of claim 3 wherein the pressure ring is composed of a high strength metal.

6. The fluid seal of claim 1 wherein the resilient means comprises a plurality of circumferentially spaced springs mounted so as to be immobile relative to the outer member.

7. The fluid seal of claim 6 wherein the springs are leaf springs.

8. In a housing, a shaft mounted in the housing for rotatable and axial movement, the housing having an annular recess opening radially inwardly toward the shaft with a radial wall and an outer axial wall, the improvement comprising a fluid seal assembly in the annular recess of the housing, the fluid seal including a seal ring being comprised at least in part of a material having a low coefficient of friction provided with a first radial surface abutting the radial wall of the housing recess, an annular recess in the seal ring opening radially inwardly toward the shaft, an O-ring seated in the annular recess of the seal ring so as to be sealingly engaged by the shaft and the seal ring whereby rotation of the shaft will impart rotational movement to the O-ring and the seal ring, an annular recess in the seal ring opening both in a first axial direction and in an outward radial direction, a pressure ring of hardened material disposed in the annular notch in abutting relation with the second radial surface of the seal ring, and resilient means in operable engagement with the pressure ring positively holding the pressure ring in sealing abutting contact with the second radial surface of the seal ring along a first sealing interface and thereby positively holding the first radial surface of the seal ring in full surface contact over a major surface area of the radial wall in the housing recess along a second sealing interface to provide rotational seals along both interfaces whereby a positive fluid-tight seal is created between the shaft and the housing.

9. In the housing of claim 8, the improvement further comprising an annular groove in the pressure ring opening radially outwardly and an O-ring seated in the annular groove in the pressure ring so as to positively engage the outer axial wall of the housing recess.

10. In the housing of claim 8, the seal ring being composed of carbon.

11. In the housing of claim 10, the pressure ring being composed of steel.

* * * * *

PO-1050
(5/69)

UNITED STATES PATENT OFFICE
CERTIFICATE OF CORRECTION

Patent No. 3,799,559      Dated  26 March 1974

Inventor(s) Allan J. Kayser

It is certified that error appears in the above-identified patent and that said Letters Patent are hereby corrected as shown below:

In the Specification:

Column 5, line 58, insert --90-- after "gap"

Column 7, line 14, cancel "125" and substitute --124--

In the Claims:

Column 9, line 41, cancel "3" and substitute --4--

Signed and sealed this 24th day of September 1974.

(SEAL)
Attest:

McCOY M. GIBSON JR.                C. MARSHALL DANN
Attesting Officer                  Commissioner of Patents